United States Patent [19]
Oestreich

[11] Patent Number: 5,127,630
[45] Date of Patent: Jul. 7, 1992

[54] METHOD FOR DRAWING CABLES INTO A PIPE

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 696,979

[22] Filed: May 2, 1991

Related U.S. Application Data

[63] Continuation of Ser. No. 472,277, Jan. 30, 1990, abandoned.

[30] Foreign Application Priority Data

Feb. 20, 1989 [DE] Fed. Rep. of Germany ....... 3905154

[51] Int. Cl.⁵ .............................................. E21C 29/16
[52] U.S. Cl. .................................................. 254/134.4
[58] Field of Search .................. 254/134.3 FT, 134.4, 254/134.3 R; 350/96.23

[56] References Cited

U.S. PATENT DOCUMENTS

| | | | |
|---|---|---|---|
| 3,283,123 | 11/1966 | Atkinson et al. | 254/134.4 |
| 3,689,031 | 9/1972 | Ruddick et al. | 254/134.4 |
| 4,508,317 | 4/1985 | Conti | 254/134.4 |
| 4,691,896 | 9/1987 | Reeve et al. | 254/134.4 |
| 4,822,005 | 4/1989 | Aleshire | 254/134.4 |

*Primary Examiner*—J. J. Hartman
*Attorney, Agent, or Firm*—Hill, Van Santen, Steadman & Simpson

[57] ABSTRACT

A method for inserting cables within a pipe characterized by closing one end of the pipe with a cap having an opening or port for introducing a flow of an agent and having a plurality of closed entry channels, opening one of said entry channels and inserting a cable through said opened entry channel while applying a flow through the opening or port so that the flowing agent creates a turbulence within the pipe for engaging the surfaces of the cable inserted through the opened entry channel to carry said cable along the length of said pipe.

10 Claims, 1 Drawing Sheet

METHOD FOR DRAWING CABLES INTO A PIPE

This is a continuation of application Ser. No. 07/472,277, filed Jan. 30, 1990, now abandoned.

BACKGROUND OF THE INVENTION

The present invention is directed to a method for introducing or pulling cables into a pipe by utilizing a flowing agent that will transport the cable as it is introduced at one end with the agent flowing out of the remote end.

European Patent Application A 0 186 753 discloses introducing a cable into a channel by utilizing a flow of air or gas. As disclosed, a plurality of longitudinal channels are kept relatively small in the cross section and are provided in a larger pipe cross section. One or more light waveguide leads are capable of being individually introduced into these longitudinal channels. Due to the small size of the cross section of these individual longitudinal channels, special measures are not required in the region of the pressure connection for the flowing agent.

In many cases, however, it is desirable to either draw cables into existing pipes having a relatively large diameter, for example 10 cm, or to lay simple and universally employable pipes that, due to the prescribed, small cross sectional area of the longitudinal channels, only allows a drawing in of a very specific number of light waveguide leads or of extremely thin cables. In addition to the disadvantages that only light waveguide leads having a relatively small cross section can be blown into the thin channels, the problem also occurs that the range of such systems are limited, even given high pressures.

SUMMARY OF THE INVENTION

The object of the present invention is to provide a specific method wherein light waveguide cables can be shot into pipes intended for the drawing-in at any time, either subsequently or simultaneously, without great outlay.

This object is achieved with an improvement in a method for drawing cables into a pipe with a flowing agent that transports the cables, said flowing agent being introduced at a near end of the pipe and flowing out of the remote end. The improvements are that the near end of the pipe is closed by a pressure-tight pressure cap having a plurality of closable entry channels for the individual cables and preferably a port for introducing the flowing agent, opening one of the individual channels and introducing a cable through said open channel, introducing a flowing agent into the near end of the pipe, said flowing agent creating a turbulence and transporting the cable along the interior of the pipe as the agent flows out the far or remote end thereof.

In the method of the invention, no special demands are made on the pipe in and of themselves because a pressure cap can be attached at any time, as needed. The available free cross section of the interior of the pipe, moreover, can be filled to a greater or lesser degree, dependent on the demands, and can also be filled at different times and, potentially, with different types of cables. The cables, that were previously shot in or cables that are already connected, do not impede the introduction of additional cables, as long as the pipe cross section is not significantly diminished by the cables already present. For example, about 30 cables having an outside diameter on the order of magnitude of 6 mm and each having about six light waveguides can still be reliably drawn into the pipe having an inside clearance of 10 cm so that the maximum of about 180 light waveguides are available overall for light transmission. Overall, the pipe cross section should be maximally filled with introduced cables to less than 20% of its total cross sectional area and preferably between 10% and 15% of this area. The remote end of the pipe will remain open during the step of insertion and is expediently protected against the entry of water after the introduction, for example by employing a cut-out cover and a sealing compound or the like.

Optical cables are preferably introduced by the method of the present invention, since these are especially light weight and relatively flexible. Insofar as has already been done in due time, the cable jackets are to be differently identified during the introduction event in order to facilitate the identification of individual cables at the remote end of the pipe. If there is a risk that the pipe may be destroyed from an outside force anywhere along the length of the pipe, an identification over the entire length of each of the cables is expedient in order to facilitate the identification during any repair work. Such a continuous marking can be undertaken during the introduction event, for example with a simple foil printer.

It is expedient to employ 10 foil optical cables whereby the outside diameter of these correspondingly flexible cables should lie in a range of between 4 mm and 10 mm. The clearance of the pipe provided for the acceptance of the optical cable expediently lies between 5 cm and 10 cm and must be adapted to the diameter and to the plurality of cables to be introduced therein.

Given employment of armored optical cables, for example with inserted aramide yarns, a normal draw-in process over the straight path can be combined with a blow-in process of the invention over highly curved sub-paths. Extremely long cable sections can be drawn-in and blown-in in this fashion. For example, cables can be drawn-in over a length of 500 m, then blown-in over an additional 500 m with the use of an auxiliary cable feeder device, such as a track-like device positioned before the pressure connection. Subsequently, further drawing-in can occur over another additional 500 m.

Other advantages and features of the invention will be readily apparent from the following description of the preferred embodiments, the drawings and claims.

DESCRIPTION OF THE PREFERRED EMBODIMENTS

The principles of the present invention are particularly useful for feeding optical cables, such as a cable CA2, into a pipe RO, which is preferably composed of a plastic material.

Figure 1:
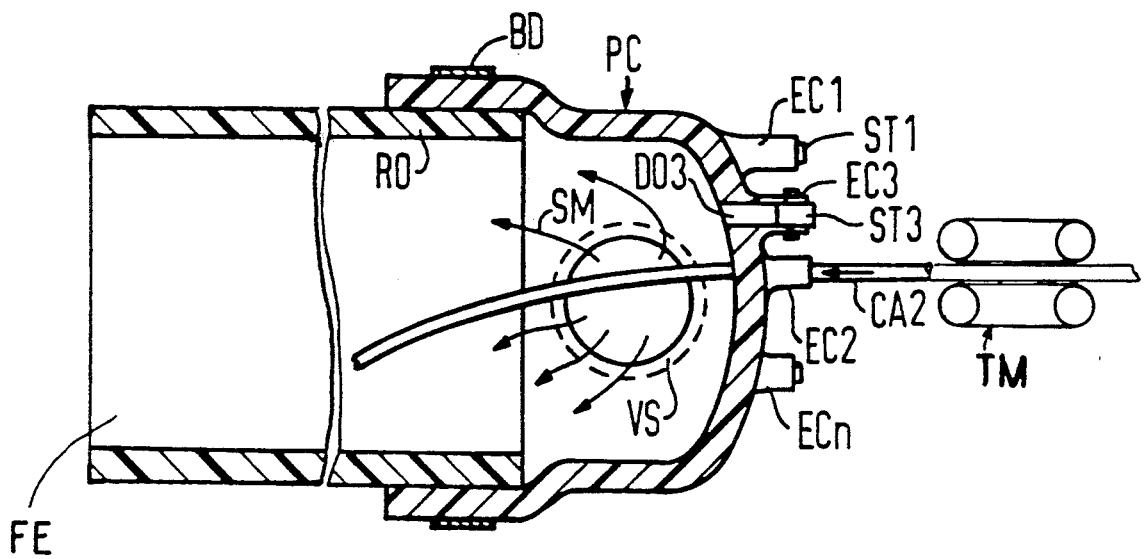
FIG. 1 is a partial longitudinal cross sectional view of an entry end for a pipe with a pressure cap utilized in performing the method of the present invention.
Figure 3:
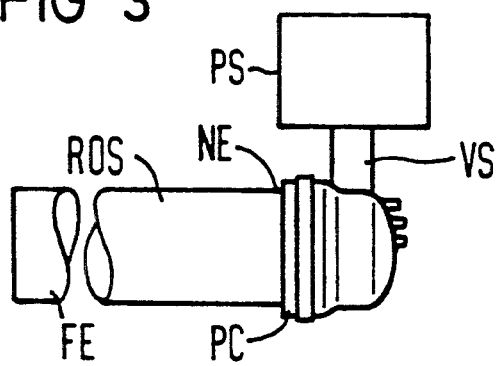
FIG. 3 is a schematic view of the structure of the pipe line composed of a plurality of individual pipes.

As illustrated in FIG. 1, the pipe RO has one end closed by a pressure-tight pressure cap PC, which is secured to the end of the pipe with a clip or band BD. The pressure cap PC has a port or connection VS through which a flowing agent SM is delivered from a pressure source PS (see FIG. 3). The flowing agent can be either a liquid or gas and is preferably air.

The pressure cap PC, in addition to the opening or connection VS, is provided with a plurality of entrance channels EC1-ECn which extend parallel to each other and are preferably along a longitudinal axis of the pipe RO. Each of these entrance channels has a through-opening, such as an opening D03 for the channel EC3. Normally, each of these entrance channels EC1-ECn is closed with a plug, such as a plug ST3 for the channel EC3, in a pressure-tight manner. For example, they can be closed with a plug and an appropriate hose clamp, or the plug can have threads and is screwed into internal threads of the channel. The total number of entrance openings EC1-ECn, which are provided in the cap PC, corresponds to the maximum number of optical cables which are to be inserted into the pipe RO.

As illustrated, a cable CA2 is being inserted through the entrance opening EC2. How an optical cable CA2 is drawn into this entrance channel is shown in the present example. To this end, a simple thrusting means (TM), for example a caterpillar or belted cable engager, can be provided on the right side of the entrance channel EC2 of the cap PC, as illustrated in FIG. 1. This thrusting means will exert a longitudinal force on the optical cable CA2 and convey it into the interior of the pipe RO. The actual forward motion, even given a curved course of the pipe, however, is created by a highly turbulent flowing agent SM that will engage the optical cable, for example CA2, to be respectively drawn-in and to form this cable in a wave-like manner or into a serpentine shape so that it will move in a longitudinal direction along the axis of the pipe RO. What is, thus, involved is a thrusting process, i.e., an attack of the flowing agent at every wave crest of the wave-like or serpentine structure of the cable.

The employment of a piston or the like at a remote cable end is not necessary with the present method. Such a draw-in aid of a piston or an enlarged end would also involve the disadvantage that it could easily become blocked, for example at narrow locations, which is not the case given a remote cable end that is simply cut smooth and is not thickened, as in the present invention. A simple protective cap that prevents an impaling or unsplicing of the cable is adequate at the remote cable end. This shoot-in event is not significantly impeded or influenced by the cables that are already drawn-in or shot-in. It is expedient to shoot-in optimally uniform cables. The cables should also be adequately flexible so that the turbulent flowing agent can bring them into the wave shape and can, thus, move them forward. A longitudinal pull, for example with a piston at the start of the cable, would stretch the cable and, thereby, eliminate the wave shape and prevent a "quantized feed" by the attack or engagement of the turbulent flow on the wave crest.

After the draw-in process, the entry location of the respective entry cable, for example the channel EC2, can be additionally sealed. This will prevent the penetration of water into the laid cable pipe. In this case, it is also expedient to seal a remote pipe end FE of FIG. 3 of the pipe line path ROS in a corresponding fashion, for example with an appropriate sealing compound of bitumen. By contrast, the remote pipe end FE (see FIG. 1) is maintained open during the actual drawing-in process whereby the near pipe end NE is closed by the pressure cap PC.

Figure 2:
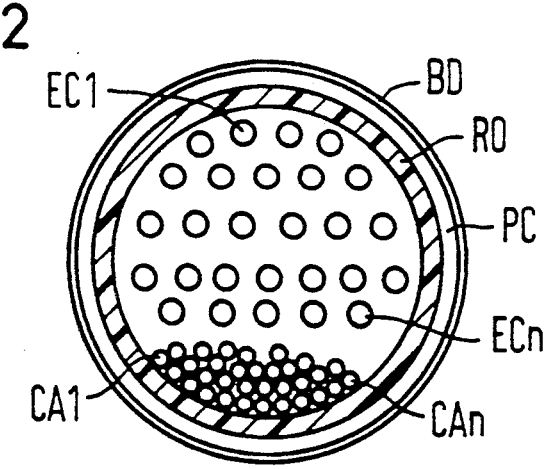
FIG. 2 is a transverse cross sectional view of the pipe of FIG. 1 facing the pressure cap.

After the draw-in of the plurality of cables CA1-CAn and after the conclusion of the drawing-in process, an overall structure similar to the illustrations of FIG. 2 will occur. The optical cables CA1-CAn lie on the floor of the pipe RO. In order to improve the clarity of the illustration, that region of the optical cables CA1-CAn is omitted, however, the respective ends would proceed through the given entry channels to the illustrated position of the optical cable CA1-CAn with a slight bending arc (see cable CA2 of FIG. 1 as an example).

Although various minor modifications may be suggested by those versed in the art, it should be understood that I wish to embody within the scope of the patent granted hereon all such modifications as reasonably and properly come within the scope of my contribution to the art.

I claim:

1. A method of drawing optical cables into a pipe with a flowing agent that transports the optical cable, said flowing agent being applied to a near end of the pipe and flowing out of a remote end of the pipe, the improvements comprising providing a pressure cap having a plurality of entrance channels extending parallel to each other along an axis of the cap and having a port for receiving a flow of said flowing agent, each of said entrance channels being closed by a plug in a pressure-tight manner, the total number of entrance channels in the cap corresponding to the maximum number of optical cables which are to be inserted into the pipe, sealing the near end of the pipe in a pressure-tight manner by securing the cap on the near end with the axis of the cap being parallel to an axis of the pipe, opening one of the entrance channels by removing the plug therefrom, inserting an optical cable to be introduced into said pipe through said one entrance channel and applying a flow of agent through said port with the flow of agent causing turbulence to engage surfaces of the optical cable inserted into the pipe to carry the optical cable along the length of said pipe towards the remote end.

2. A method according to claim 1, wherein the remote end of the pipe is kept open during the process of inserting the optical cables.

3. A method according to claim 2, wherein each of the optical cables has a diameter in a range of between 4 mm and 10 mm.

4. A method according to claim 3, wherein the pipe has an interior transverse cross section and said step of filling introduces cables to fill the interior transverse cross section to less than 20% with cables.

5. A method according to claim 1, wherein the pipe has an internal cross section and said method of inserting optical cables inserts optical cables to fill the internal cross section of the pipe to less than 20%.

6. A method according to claim 1, wherein the diameter of the optical cables is selected to be in a range of between 4 mm and 10 mm.

7. A method according to claim 3, wherein the pipe has an internal cross section and said method includes inserting more than one optical cable into the pipe by repeating the steps of opening an additional entrance and inserting an optical cable therein until the internal cross section of the pipe is filled with optical cables to less than 20% of the internal cross section of the pipe.

8. A method of inserting more than one optical cable into a pipe having a single hollow interior with a near end and a remote end, the method comprises the steps of providing a pressure cap having a plurality of entrance channels extending parallel to each other along an axis of the cap and having a port for receiving a flow of a flowing agent, each of said entrance channels being closed by a plug in a pressure-tight manner, the total number of entrance channels in the cap corresponding to the maximum number of optical cables which are to be inserted into the pipe, sealing the near end of the pipe in a pressure-tight manner by securing the cap on the near end with the axis of the cap extending parallel to an axis of the pipe, opening one of the entrance channels by removing the plug therefrom, inserting a first optical cable to be introduced into said pipe through said one entrance channel and applying a flow of agent through said port and out the remote end with the flow of the agent causing turbulence to engage surfaces of the first optical cable inserted into the one entrance channel to carry the first optical cable along the hollow interior over the length of said pipe towards the remote end, after completing the insertion of the cable being inserted through said one entrance channel then opening a second entrance channel by removing the plug therefrom and then inserting another cable through the second entrance channel into said hollow interior and moving the other cable by said flow along the first optical cable in the hollow interior over the length of said pipe towards the remote end.

9. A method of drawing optical cables into a pipe with a flowing agent that transports the optical cable, said flowing agent being applied to a near end of the pipe and flowing out of a remote end of the pipe, the improvements comprising providing a pipe with a single hollow interior with an internal diameter in a range of 5 to 10 cm, providing a pressure cap having a plurality of entrance channels extending parallel to each other along an axis of the cap and having a port for receiving a flow of said flowing agent, each of said entrance channels being closed by a plug in a pressure-tight manner, the total number of entrance channels in the cap corresponding to the maximum number of optical cables which are to be inserted into the pipe, sealing the near end of the pipe in a pressure-tight manner by securing the cap on the near end with the axis of the cap being parallel to an axis of the pipe, opening one of the entrance channels by removing the plug therefrom, inserting an optical cable to be introduced into said pipe through said one entrance channel and applying a flow of agent through said port with the flow of agent causing turbulence to engage surfaces of the optical cable inserted into the pipe to carry the optical cable along the length of said pipe towards the remote end.

10. A method according to claim 9 which includes adding at least a second optical cable to lie next to the first mentioned optical cable by removing a plug from another entrance to open the entrance, insert the second optical cable into the other entrance and applying a flow of agent through the port to carry the second cable along the first cable in the hollow interior.

* * * * *